Sept. 26, 1972   H. NERWIN   3,694,210
PHOTOGRAPHIC FILM ASSEMBLAGE
Filed Nov. 27, 1970   2 Sheets-Sheet 1

HUBERT NERWIN
INVENTOR.

BY J. Addison Matthew
   R. W. Hampton
ATTORNEYS

HUBERT NERWIN
INVENTOR.

ATTORNEYS

United States Patent Office 3,694,210
Patented Sept. 26, 1972

3,694,210
PHOTOGRAPHIC FILM ASSEMBLAGE
Hubert Nerwin, Rochester, N.Y., assignor to Eastman Kodak Company, Rochester, N.Y.
Filed Nov. 27, 1970, Ser. No. 93,196
Int. Cl. G03c 1/48
U.S. Cl. 96—76 C          5 Claims

ABSTRACT OF THE DISCLOSURE

An assemblage of self-processing photographic film units initially arranged in stacked relation with interleaved transporting and connecting leaders. Certain of the leaders initially are releasably bonded or tacked to portions of their respective film units so that the withdrawal of such leaders develops a moving transverse fold in the leader that moves longitudinally in a smooth and predictable fashion to prevent jamming or binding.

BACKGROUND OF THE INVENTION

Field of the invention

The present invention relates to photography and more particularly to assemblages of self-processing photographic film units.

Description of the prior art

One type of film assemblage to which the present invention is particularly directed comprises a plurality of film units, each including a photosensitive element and a process sheet. Initially, the photosensitive elements are arranged for successive exposure in a first stack and their respective processing sheets are arranged in a second stack separate from the photosensitive elements. Each film unit is provided with one or more flexible leaders usually connected directly to the photosensitive element and indirectly to the process sheet, and such leaders are interleaved within and between the abovementioned stacks to form a compact assemblage. A protective mask or dark slide also is provided, and its withdrawal from the assemblage automatically threads the leading end portion of the leader of the first available film unit between pressure members of an associated camera and to a position accessible from the camera exterior. After the photosensitive element of the first film unit has been exposed, it is then threaded leader is manually withdrawn from the camera, both for moving the exposed photosensitive element into confronting or superposed alignment with a corresponding process sheet, and for transporting the superposed element and sheet between the camera pressure members and from the camera. In a similar manner, the leading end portion of the leader of the next successive film unit is threaded between the pressure members, as the first film unit is withdrawn, and then is separated from the first film unit at a position where the newly threaded leader is accessible from the camera exterior. An illustrative example of such a film assemblage is disclosed, for example, in my copending U.S. Pat. application Ser. Nos. 52,027 now abandoned and 52,028 now abandoned; entitled Photographic Film Assemblage and Film Assemblage; filed on July 2, 1970.

If the type of film pack described above is to perform properly, it is essential that the various leaders roll or unfold progressively as they are withdrawn from their interleaved positions. However, experience has shown that such leaders will sometimes fail to roll properly and instead will cause premature movement of a portion of one of the film units, or will enter the pressure members in a folded condition. This, in turn, may damage that film unit and possibly jam the entire assemblage or the camera.

In another type of film unit with which the present invention may be used, the photosensitive element and process sheet are provided in preregistered form. A unit of this type is disclosed, for example, in my U.S. applications Ser. Nos. 77,485 and 77,474 now abandoned, entitled Photographic film Assemblage and Film Assemblage, filed on Oct. 2, 1970.

SUMMARY OF THE INVENTION

A principal object of the present invention is to overcome the abovementioned film-pack reliability problems; a correlated object being to solve that problem without materially altering the structure or mode of production of such a film pack.

Briefly, these related objects are accomplished in accordance with a preferred embodiment of the invention by releasably "tacking" portions of the leaders to adjacent surfaces of the photosensitive elements or process sheets that are maintained immovable while those leaders are being pulled from the assemblage. This "tacking" is preferably accomplished by small areas of adhesive material along the margins of the respective leaders and prevents those leaders from any unwanted sliding relative to the confronting immovable surfaces to which they are attached. Accordingly, the application of a pulling force to such leaders establishes a transverse fold that moves progressively along the leader in the desired manner. By proper selection of the nature and disposition of the adhesive material, or equivalent tacking means employed, the resulting bond is sufficiently strong to prevent unwanted sliding of the tacked leader but can be readily peeled apart by the progressive movement of the transverse fold as it moves along the leader.

Various means for practicing the invention and other advantages and novel features thereof will be apparent from the following detailed description of illustrative preferred embodiments of the invention, reference being made to the accompanying drawings in which like reference characters denote like elements.

DESCRIPTION OF THE ILLUSTRATIVE PREFERRED EMBODIMENTS

Figure 1:
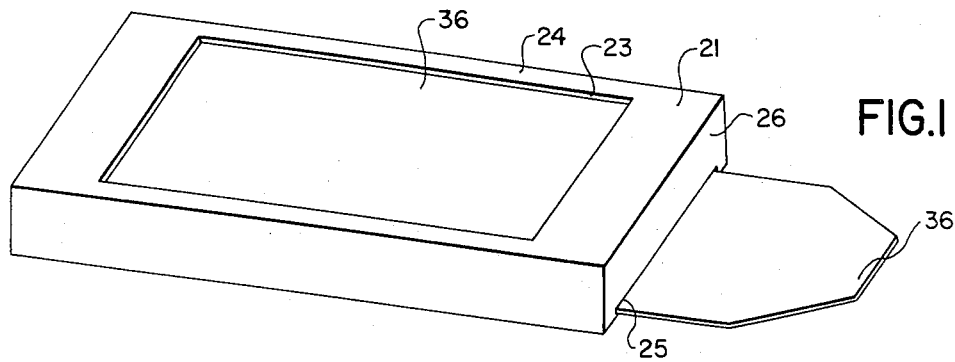
FIG. 1 is a perspective pictorial view of a self-processing film pack adapted to incorporate the present invention.
Figure 2:
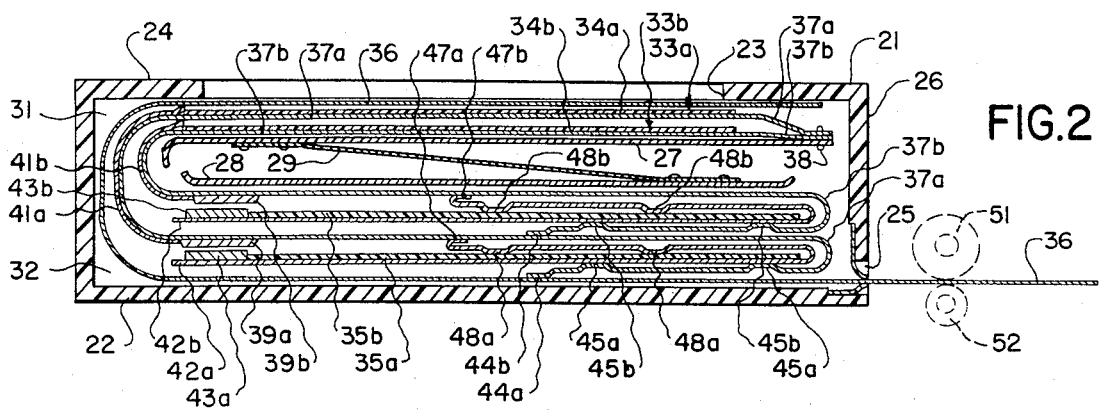
FIG. 2 is a somewhat schematic cross-sectional side-elevational view of the film pack shown in FIG. 1, depicting the initial positions of the film units and the opaque masking strip.

The illustrative film pack shown in the accompanying drawings comprises a rigid generally rectangular casing 21 which is illustrated in FIG. 1 as if it were lying on its flat back wall member 22 (FIG. 2). The casing is provided with a rectangular exposure opening 23 in its front wall member 24 and with an elongate exit slot 25 in its end wall 26. As shown in FIG. 2, a flat front pressure plate 27 is located within the casing behind exposure opening 22 and is connected to a back pressure plate 28 by a resilient leaf spring 29, which urges the two pressure plates apart and holds them in resilient engagement with the stacked film unit elements housed in the respective front and back casing compartments 31 and 32.

For explanatory purposes, the illustrative film pack is shown initially loaded with only two film units 33a and 33b, but it should be realized that more than two such film units would normally be provided and that they would be stacked together more compactly in a forward to rearward direction than shown in the drawings. The two film units are substantially identical and are shown with their respective components identified by the same reference numerals followed by either the suffix a or b to designate the corresponding film unit 33a or 33b.

In accordance with the illustrative preferred embodiment of the invention, each of the film units includes two film sheets comprising a first photosensitive element or sheet 34 and a second cover sheet or process element 35. Further details of such film elements, and the manner in which they cooperate to provide a finished photograph, are described in commonly assigned copending U.S. Pat. application Ser. No. 869,189 entitled Novel Dye Diffusion Transfer Process and Material, filed Oct. 24, 1969 now abandoned in the names of C. R. Barr et al. For purposes of understanding the present invention, however, it will suffice to explain that an image is focused on the exposure surface of the photosensitive element, for recording that image in latent form, and then the exposed element is inverted and superposed over or sandwiched with the process sheet, for developing the latent image and establishing a finished print. Such development is effected by a processing fluid that is distributed between the photosensitive element and process sheet, preferably to produce a permanent image constructed by the diffusion of dye materials activated in accordance with the imagewise development of one or more layers of silver halide emulsions. The final visible image or print may be constructed in the process sheet or between the process sheet and photosensitive element. Preferably, however, it is constructed in the photosensitive element itself and is visible against a white opaque background on the opposite side of the photosensitive element from the exposed side. The film unit also is preferably of the integral type, wherein the process sheet is permanently cemented to the photosensitive element after they are superposed. The photosensitive element is light sensitive only from its front or exposure surface, and the process sheet preferably is opaque, thus permitting development of the unit outside the camera, or otherwise while exposed to ambient light, once the process sheet has been superposed with the light sensitive side of the element. The finished photograph then comprises both sheets permanently laminated together, and provides a correct (right-reading) image without resort to image reversing optics in the camera.

As best shown in FIG. 2, the photosensitive elements 34 initially are arranged in stacked relation behind the exposure opening 22, which is temporarily covered by an elongate opaque dark slide or mask strip 36 to prevent premature exposure of the elements. Each photosensitive element is carried by a respective elongate flexible leader strip 37, to which the reverse surface of the photosensitive sheet is releasably coupled by a separable pressure sensitive adhesive material. Beyond the ends of the photosensitive elements adjacent casing end wall 26, the trailing ends of the leader strips are attached to the front pressure plate by a staple 38 or the like. At the opposite end of the pressure plate assembly, the leader strips and the mask strip curve rearwardly into the back casing compartment 32. The leading end of the mask strip emerges from that compartment through slot 24, which is provided with flexible sealing strips or the equivalent to prevent light from entering the casing via that opening. Processing fluid containers or pods 39, which can be of the type disclosed more fully in U.S. Pat. 2,750,075, are permanently attached to the leader strips within the back casing compartment and are provided with bibs or funnels 41 through which processing fluid is subsequently conducted to the corresponding film members during the processing operation.

The two process sheets 35a and 35b are stored rearwardly of the photosensitive elements in the back casing compartment behind back pressure plate 28. As previously described in connection with the photosensitive elements, the rearward faces of the process sheets are removably attached to corresponding leaders or connector strips 42, by a pressure sensitive adhesive. The trailing ends of the connector strips extend beyond the cover sheets and are permanently affixed to respective processing fluid collectors or traps 43, which can be of the type disclosed in U.S. Pat. No. 2,686,717.

Figure 3:
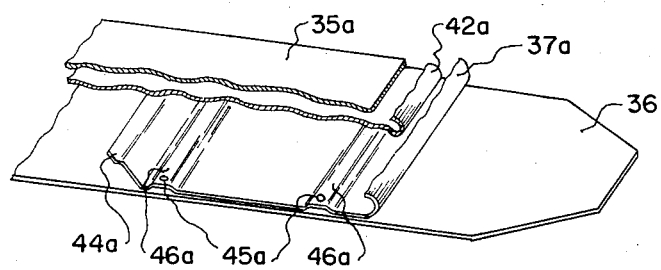
FIG. 3 is a perspective fragmentary view of the masking strip and a portion of the first film unit with its leader connected to the masking strip.

As shown in FIGS. 2 and 3, the leader strips are folded around the corresponding ends of the process sheets adjacent casing wall 26 so that the leading or lost motion portion of leader strip 37a lies between mask strip 36 and connector strip 42a and the leading or lost motion portion of leader strip 37b lies between leader strip 37a and connector strip 42b. The leading tip of leader strip 37b is connected to leader strip 37a by a joint 44b and the leading tip of strip 37a is similarly connected to mask strip 36 by a corresponding joint 44a. As described below, joints 44 are adapted to separate under a predetermined tension. In accordance with the present invention, the leading or lost motion portion of each leader strip is separably connected to the process sheet of the same film unit by a plurality of small longitudinally spaced areas or spots of rupturable pressure sensitive adhesive material 45, best shown in FIG. 3, which separably bond that portion of the leader strip to the corresponding connector strip along their confronting margin surfaces. In the illustrative embodiments of the invention, this tacking adhesive is applied to the opposite ends of shallow ribs or arches 46 (FIG. 3) embossed in transverse relation to the leader strips. Such transverse arches or the like are not essential to this feature of the invention, however, and can be omitted if desired; in which case the spots of tacking adhesive are simply spaced along the confronting flat marginal surfaces of the leader and connector strips. As used in the present application, the term "adhesive" is used in its broadest sense, and is intended to include cohesives, heat or sonic seals, and similar types of connecting mechanisms.

Figure 4:
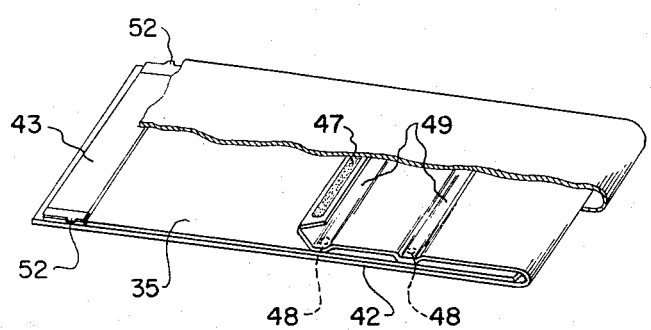
FIG. 4 is a perspective fragmentary view of a process sheet incorporated in the illustrative film pack, depicting the manner in which one of the leaders is folded and tacked to the margins of that sheet.

The leading or lost motion portions of connector strips 42 are folded so that they initially lie along the front surfaces of the respective process sheets and are connected at their leading tips to the corresponding leader strips by inseparable adhesive joints or connections 47. In the same manner just described, the leading portion of each connector strip is connected or tacked directly to the confronting margin surfaces of the corresponding process sheet by a plurality of small spaced spots of rupturable adhesive 48 depicted in FIG. 4. The connector strips are likewise illustrated as being provided with embossed transverse ribs or arches 49 (FIG. 4) to which the tacking material is applied, but that feature can be omitted as described above in connection with the corresponding feature of the illustrative leader strips.

When the film pack is loaded into an appropriate camera, not shown, the camera's lens system is in light-tight communication with the film pack exposure opening 23 and the leading end of the mask strip extends out of the camera housing between a pair of opposed pressure members schematically illustrated by rollers 51 and 52. A typical example of such a camera is depicted in my U.S. Pat. application Ser. No. 52,026 entitled Assemblage and Pack of Self-Processing Photographic Film Units, filed on July 2, 1970, now U.S. Pat. 3,659,511. Corresponding camera illustrations have been omitted from the present disclosure in the interest of brevity inasmuch as the invention does not relate to the construction of the camera per se.

Figure 5:
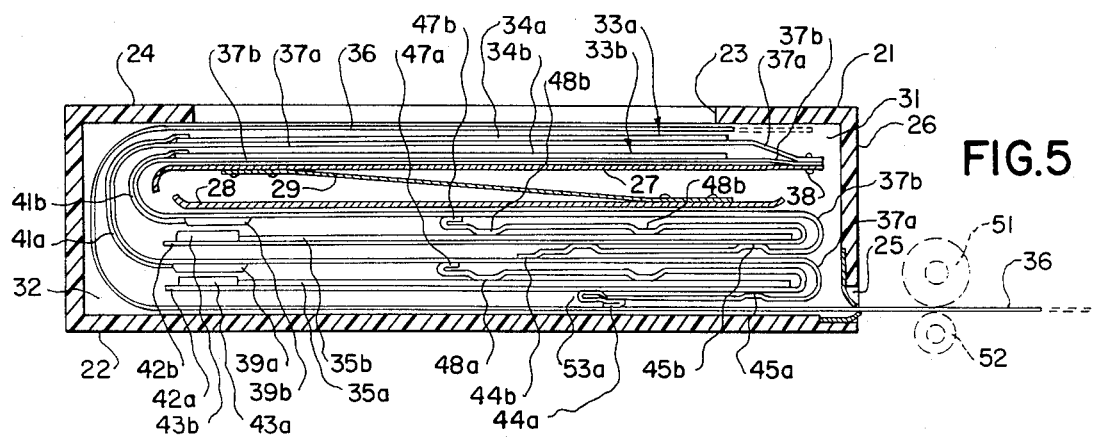
FIG. 5 corresponds to FIG. 2 and shows the manner in which the leader of the first available film unit is caused to move progressively to an accessible position from its initial location between that film unit and the masking strip in response to withdrawal of the latter.
Figure 8:
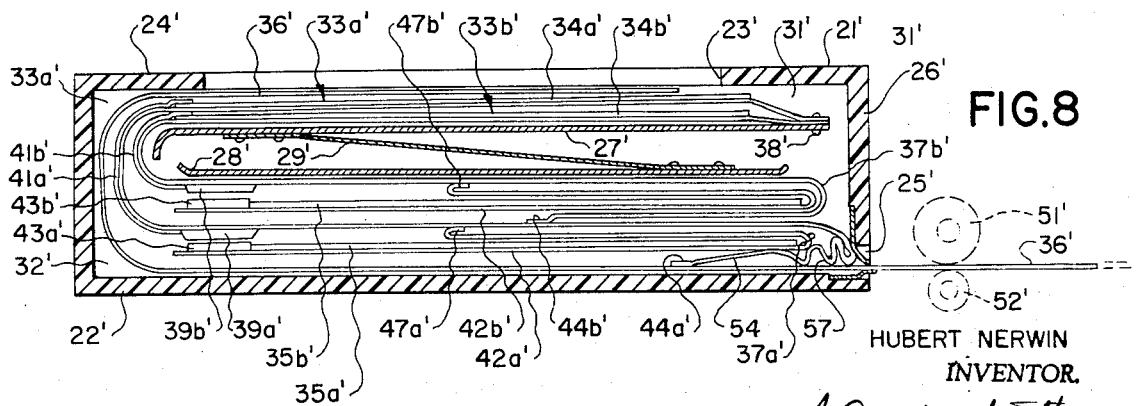
FIG. 8 corresponds generally to FIG. 5 but depicts a film pack that does not incorporate the present invention, to illustrate one manner in which jamming can occur in such a film pack during the same mask strip withdrawal operation illustrated in FIG. 5.

After the camera has been loaded, the photographer grasps the end of mask strip 36, which is accessible from the exterior of the camera housing, and pulls it away from the camera. As the mask strip is withdrawn, the two film units remain in their initial positions because of friction between the various elements of those units and the attachment of the leader strips to the front pressure plate by staple 38. In a similar manner, the process sheet 35 and their connector strips 42 initially are restrained from movement by outwardly extending tabs 52' (FIG. 4) at their trap ends, and corresponding cartridge surfaces (not shown), as disclosed more fully in commonly assigned copending U.S. Pat. Application Ser. No. 841,864 entitled Photographic Film Pack filed on July 15, 1969, now U.S. Pat. 3,613,537, in the name of D. A. Frost; the disclosure of which is hereby incorporated into the present application by reference. Since the leading tip of leader strip 37a is attached to the mask strip, the initial movement of the latter moves the tip of that leader along with the mask strip toward the casing exit slot 25. Because of the tacking means temporarily joining the margins of the leading portion of leader strip 37a to the confronting margin surfaces of the temporarily immovable process sheet 35a, or its connector strip 42a, the leader strip is prevented from sliding relative to connector strip 42a or process sheet 35a. Accordingly, the segment of the leader strip closely adjacent its separable tip joint 44a develops a transverse fold 53 that moves progressively toward the exit slot as shown in FIG. 5. Joint 44a is stronger than the spots of tacking adhesive temporarily holding the leader strip and the connector strip together so that the moving fold can easily rupture the tacking joints or connections as they are successively encountered. Accordingly, it will be apparent that the leading tip of the leader strip moves toward and through the casing exit slot 25 in a smooth and predictable manner without buckling or wrinkling. By way of comparison, FIG. 8 depicts the same mask strip withdrawal operation being performed with a film pack devoid of the tacking means of the present invention and illustrates one possible manner in which initial sliding of leader strip 54 can cause that strip to fold other than at its leading end and to jam the exit slot 25' of the film pack casing 26' as its folded and buckled leading portion 57 is drawn into that slot by mask strip 36'.

When the movement of the leading end of leader strip 37a has absorbed all of the slack in that strip, it is temporarily prevented from further movement by the fact that its trailing end is attached to front pressure plate 27 by staple 38. As previously mentioned, the joint 44a between the mask strip and leader strip 37a is made only strong enough to ensure that the leading portion of that leader strip ruptures the tacking means by which it is separably attached to the connector strip but not strong enough to pull film unit 33a free of staple 38. This is accomplished by proper selection of the area and nature of the adhesive bond employed and is facilitated by the fact that the leader strip is folded back on itself after it emerges from the camera; thereby providing a reverse bend connection which is separated by a peeling force rather than by a straight shearing force. After joint 44a has been broken or separated, the photographer continues to pull on the mask strip until it is removed entirely from the camera. With the mask strip removed, the front pressure plate 27 biases the photosensitive sheets forwardly so that the margins of sheet 34a bear against the inner surface of front casing wall 24 surrounding exposure opening 23; thus locating the emulsion surface of that sheet in coincidence with a focal plane of the camera lens system.

Figure 6:
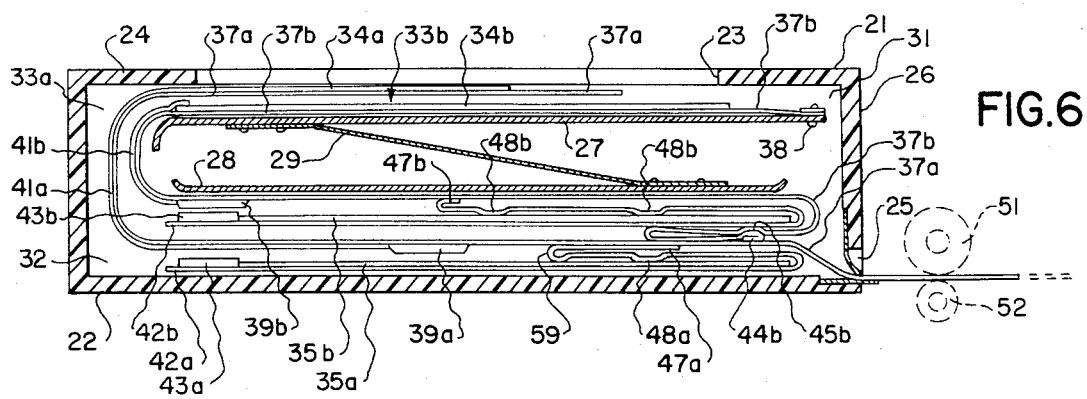
FIG. 6 corresponds to FIGS. 2 and 5 and shows the manner in which a leader between the first and second film units is withdrawn from its initial slack position in response to withdrawal of a leader of the first film unit.

After sheet 34a has been exposed, the accessibe end of its leader strip 37a is grasped and pulled in the same manner in which the mask strip was removed; thereby causing its trailing end to tear free from staple 38 so that the exposed photosensitive sheet 34a moves toward the corresponding process sheet 35a as shown in FIG. 6. During this relative movement between sheets 34a and 35a, the initial slack in connector strip 42a is absorbed by the progressive movement of a longitudinal transverse fold 59 (FIG. 6) established by the small spots of rupturable tacking adhesive 48 previously described. Concurrently, leader strip 37b is also withdrawn to an accessible position and is separated from leader strip 37a in the same manner in which the latter strip was previously withdrawn by the removal of the mask strip. As explained above, the invention therefore ensures that the initially slack leading portions of both the leader strips and the connector strips are withdrawn through the casing exit slot in an orderly manner without danger of buckling or jamming. When withdrawal of the leader strip 37a has absorbed all of the available slack in connector strip 42a, the two sheets 34a and 35a are aligned in sandwiched relation between strips 37a and 42a and thereafter move in unison. As the superimposed sheets pass between rollers 51 and 52, the fluid supply pod 39a is ruptured and the fluid therein is squeezed through funnel 41a and distributed between the confronting sheet surfaces. As the trailing ends of the superimposed sheets reach the rollers, the excess processing fluid is squeezed into the processing fluid trap 43a. After film uit 33a has been removed from the camera, the tip of leader strip 37b is accessible to the photographer, thereby allowing the same operations to be repeated after the photosensitive sheet 34b has been exposed.

Figure 7:
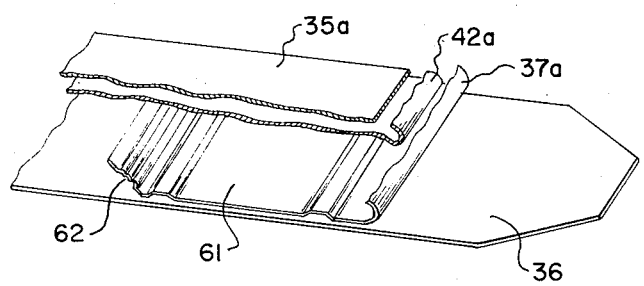
FIG. 7 corresponds generally to FIG. 3 and illustrates an alternate embodiment of the invention in which the leading end of the illustrated leader is corrugated to provide a preferential folding zone which further ensures the commencement of the transverse fold adjacent the leading end of that strip.

FIG. 7 corresponds generally to FIG. 3 and illustrates an alternate embodiment of the invention in which the portion of the illustrated leader strip 61 is transversely corrugated or wrinkled as shown at numeral 62. This corrugating or wrinkling reduces the stiffness of the leader strip immediately adjacent the joint by which its tip is connected to the mask strip or to the preceding leader strip and thereby further ensures the development of the transverse fold at that particular place. Obviously, the same corrugating means can also be employed adjacent the tip of each of the interleaved connector strips for the same purpose.

Although both leader strips and the connector strips are temporarily tacked to adjacent film unit surfaces in the embodiments of the invention described above, it should be apparent that such tacking means could be employed selectively only in connection with the particular strips that prove troublesome, and that the strip corrugation embodiment illustrated in FIG. 7 could likewise be employed wherever it proved valuable, either alone or in conjunction with the subject tacking means. Similarly, the tacking could be provided between adjacent film units, or between one or more film units and the cartridge. Also, it should be recognized that the invention is not limited in utility to the particular type of film unit disclosed and described but is equally applicable to other types of analogous film units and assemblages thereof.

The invention has been described in detail with particular reference to illustrative preferred embodiments thereof, but it will be understood that variations and modifications can be effected within the spirit and scope of the invention as described hereinabove and as defined in the appended claims.

I claim:
1. A photographic film pack comprising:
   a generally rectangular casing defining front and back sides, first and second ends, and an exit aperture in said first end, said casing further defining a first direction extending from said second end toward said first end;
   a self-processing film unit in said casing, said film unit including a leader for transporting said film unit from said casing through said exit aperture, said leader having an elongate portion in a first orientation wherein said elongate portion defines a first surface facing forward and a second surface facing backward relative to said front and back sides of said casing;
   means for progressively rolling sections of said elongate portion back upon itself to establish an inverted elongate portion, said inverted elongate portion being oriented with said first surface facing backward and said second surface facing forward relative to said back and front sides of said cartridge, said inverted elongate portion being movable from said casing through said exit aperture for aiding in transporting at least a portion of said fim unit from said casing through said exit aperture; and
   means for establishing a first location on said elongate portion, spaced within said casing from said exit aperture, at which said rolling back of said elongate portion must begin, and thereafter for insuring controlled movement of said rolling back location along said elongate portion in said first direction by preventing movement in said first direction of any sections of said elongate portion not yet inverted.

2. A film pack as claimed in claim 1, wherein said pack includes an initially immobile element maintained in a stationary position relative to said casing at least until after said elongate portion of said leader is moved from said casing through said exit aperture, and wherein said last-mentioned means comprises a mechanism for releasably coupling said elongate portion of said leader to said initially immobile element.

3. A film pack as claimed in claim 2, wherein said film unit comprises a photosensitive element and a process sheet spaced apart from said photosensitive element, wherein said initially immobile element comprises a respective one of said photosensitive element and process sheet, and wherein said releasable coupling mechanism is an adhesive.

4. A film pack as claimed in claim 3, wherein said adhesive comprises a plurality of rupturable adhesive joints coupling marginal regions of said elongate portion to marginal regions of said process sheet in confronting relation thereto.

5. A film pack as claimed in claim 4, wherein said adhesive joints comprise relatively small spots of adhesive material spaced from each other in said first direction.

References Cited
UNITED STATES PATENTS

| | | | |
|---|---|---|---|
| 3,433,636 | 3/1969 | Hamilton | 96—76 R |
| 3,479,184 | 11/1969 | Land et al. | 96—76 R |

NORMAN G. TORCHIN, Primary Examiner

J. L. GOODROW, Assistant Examiner